(No Model.)

E. T. GREENFIELD.
INSULATING JOINT FOR METAL OR ARMORED CONDUIT TUBES.

No. 570,166. Patented Oct. 27, 1896.

WITNESS:
Edward Rowland.
M. M. Robinson.

INVENTOR
Edwin T. Greenfield
BY
Charles J. Kintner
ATTORNEY

THE NORRIS PETERS CO., PHOTO-LITHO., WASHINGTON, D. C.

UNITED STATES PATENT OFFICE.

EDWIN T. GREENFIELD, OF NEW YORK, N. Y., ASSIGNOR TO THE INTERIOR CONDUIT AND INSULATION COMPANY, OF SAME PLACE.

INSULATING-JOINT FOR METAL OR ARMORED CONDUIT-TUBES.

SPECIFICATION forming part of Letters Patent No. 570,166, dated October 27, 1896.

Application filed April 6, 1896. Serial No. 586,427. (No model.)

*To all whom it may concern:*

Be it known that I, EDWIN T. GREENFIELD, a citizen of the United States, residing at New York, in the county of New York and State of New York, have made a new and useful Improvement in Insulating-Joints for Metal or Armored Conduit-Tubes, of which the following is a specification.

My invention has for its object the construction of a perfect insulating-joint between the two ends of adjoining metal or armored conduit-tubes having an insulating-lining, and will be fully understood by referring to the accompanying drawings, in which—

Figure 1:
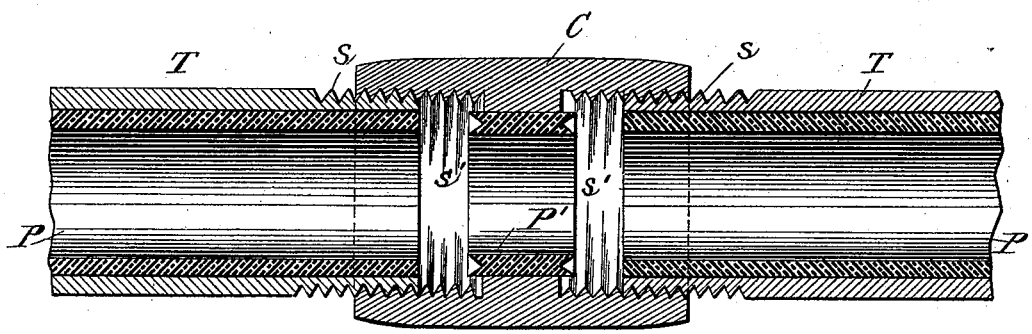
Figure 2:
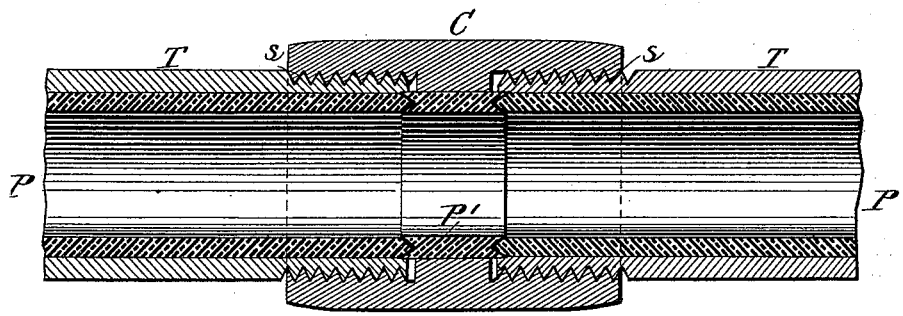

Figure 1 is an enlarged longitudinal sectional view of a pair of metal or armored conduit-tubes lined with insulating material and united together by a screw-threaded collar having my improved insulating-joint embodied therein. Fig. 2 is a similar sectional view showing the parts firmly screwed together, so that the interior insulating-lining constitutes in effect, with the insulating-joint, a perfect continuous insulation.

Referring now to the drawings in detail, T T represent two iron armored conduit-tubes provided with a lining of insulating material P, preferably paper, which has been treated in any of the well-known ways for perfecting the insulation of such tubes. The two adjoining ends of these tubes T T are screw-threaded, as shown at s s.

C represents a locking-collar provided with female screw-threads s' s', adapted to receive the screw-threads s s. In the center of the locking-collar C is located a thimble P' of insulating material of substantially the same inner and outer diameters as is the lining P to the tubes T. This thimble P' is made, preferably, of hard rubber, although any other good insulating material which is sufficiently hard may supplant it. In its opposite ends are formed V-shaped grooves, and when in position it fits snugly within the central part of the collar C. When the tubes T T are forced firmly home with a pipe-wrench under the influence of the screw-threads s s s' s', the inner ends of the insulating-linings P P are brought firmly into contact with the V-shaped grooves at the opposite ends of the thimble P' and are caused to be firmly embedded therein and to assume the shape or conformation shown in Fig. 2, so that the interior linings P P of tubes T T and the thimble P' constitute one insulating-lining which is absolutely water-tight.

I find that with such an arrangement I am enabled to so firmly unite the inner ends of the insulating-linings with the grooved ends of the insulating-thimble that most perfect insulation is effected and in the simplest possible manner.

Having thus described my invention, what I claim, and desire to secure by Letters Patent of the United States, is—

1. As a means for joining armored conduit-tubes, a collar which is interiorly screw-threaded at its opposite ends and provided with an interior thimble of insulating material, said thimble having V-shaped grooves at its opposite ends and being adapted to receive, under pressure, the ends of the insulating-linings as said conduit-tubes are bound together by the screw-threaded collar.

2. A joint for two metal armored conduit-tubes, consisting of a metal collar surrounding a thimble of insulating material having V-shaped grooves at its opposite ends, said collar and armored conduit-tubes being provided with means for uniting them firmly together under pressure so that the lining thereof and the opposite ends of the thimble constitute, in effect, one continuous insulating-tube.

In testimony whereof I have hereunto subscribed my name this 4th day of April, 1896.

EDWIN T. GREENFIELD.

Witnesses:
C. J. KINTNER,
W. T. RUETE.